United States Patent
Chung et al.

(10) Patent No.: US 8,949,926 B2
(45) Date of Patent: Feb. 3, 2015

(54) METHOD FOR PROTECTING CONTENTS, METHOD FOR SHARING CONTENTS AND DEVICE BASED ON SECURITY LEVEL

(75) Inventors: Min Gyu Chung, Seoul (KR); Sung Hyun Cho, Seoul (KR); Koo Yong Pak, Seoul (KR); Il Gon Park, Seoul (KR); Soo Jung Kim, Seoul (KR); Kumar K. Kiran, Seoul (KR)

(73) Assignee: LG Electronics Inc., Seoul (KR)

( * ) Notice: Subject to any disclaimer, the term of this patent is extended or adjusted under 35 U.S.C. 154(b) by 665 days.

(21) Appl. No.: 12/597,252

(22) PCT Filed: Apr. 23, 2008

(86) PCT No.: PCT/KR2008/002301
§ 371 (c)(1),
(2), (4) Date: Apr. 8, 2010

(87) PCT Pub. No.: WO2008/130191
PCT Pub. Date: Oct. 30, 2008

(65) Prior Publication Data
US 2010/0186065 A1     Jul. 22, 2010

Related U.S. Application Data

(60) Provisional application No. 60/913,388, filed on Apr. 23, 2007, provisional application No. 60/949,722, filed on Jul. 13, 2007.

(51) Int. Cl.
*G06F 17/00*     (2006.01)

(52) U.S. Cl.
USPC .......................................................... 726/1

(58) Field of Classification Search
USPC ............................................................ 726/1
See application file for complete search history.

(56) References Cited

U.S. PATENT DOCUMENTS

| | | | |
|---|---|---|---|
| 5,949,877 A | | 9/1999 | Traw et al. |
| 6,160,903 A | * | 12/2000 | Hamid et al. ................. 382/115 |
| 8,010,786 B1 | | 8/2011 | Ward |
| 2002/0157002 A1 | | 10/2002 | Messerges et al. |
| 2002/0191764 A1 | | 12/2002 | Hori et al. |
| 2003/0016829 A1 | | 1/2003 | Chu |

(Continued)

FOREIGN PATENT DOCUMENTS

| | | |
|---|---|---|
| CN | 1610914 A | 4/2005 |
| CN | 1685706 A | 10/2005 |

(Continued)

OTHER PUBLICATIONS

Office Action issued by JPO on Dec. 6, 2011 for the corresponding JP Patent Application No. 2010-507321.

(Continued)

*Primary Examiner* — Esther Benoit
(74) *Attorney, Agent, or Firm* — Fish & Richardson P.C.

(57) ABSTRACT

A method for using contents, a method for sharing contents, and a device based on security level are disclosed. A method for using contents based on security level creates a device security level according to the number of device identification elements, receives contents, and if the device security level is found to be a minimum allowed device security level for using the contents, uses the contents. Therefore, a device that does not satisfy the conditions required for using contents cannot use the contents, whereby security is reinforced.

5 Claims, 7 Drawing Sheets

(56) References Cited

U.S. PATENT DOCUMENTS

| | | |
|---|---|---|
| 2003/0018491 A1 | 1/2003 | Nakahara et al. |
| 2003/0065921 A1 | 4/2003 | Chang |
| 2003/0126086 A1 | 7/2003 | Safadi |
| 2004/0030656 A1 | 2/2004 | Kambayashi et al. |
| 2004/0102987 A1 | 5/2004 | Takahashi et al. |
| 2004/0103303 A1 | 5/2004 | Yamauchi et al. |
| 2004/0139312 A1* | 7/2004 | Medvinsky .................. 713/150 |
| 2004/0158731 A1 | 8/2004 | Narin et al. |
| 2005/0100167 A1 | 5/2005 | Alve et al. |
| 2005/0120232 A1 | 6/2005 | Hori et al. |
| 2005/0138351 A1 | 6/2005 | Lee et al. |
| 2005/0154921 A1 | 7/2005 | Medvinsky |
| 2005/0182931 A1 | 8/2005 | Robert et al. |
| 2005/0216739 A1 | 9/2005 | Lee et al. |
| 2006/0020784 A1 | 1/2006 | Jonker |
| 2006/0047957 A1 | 3/2006 | Helms et al. |
| 2006/0093138 A1 | 5/2006 | Durand et al. |
| 2006/0154648 A1 | 7/2006 | Oh et al. |
| 2006/0218641 A1 | 9/2006 | Koerber |
| 2006/0235798 A1 | 10/2006 | Alkove et al. |
| 2006/0235801 A1 | 10/2006 | Strom et al. |
| 2006/0272004 A1 | 11/2006 | Brockhaus et al. |
| 2007/0079381 A1 | 4/2007 | Hartung et al. |
| 2007/0088660 A1 | 4/2007 | Abu |
| 2007/0100701 A1 | 5/2007 | Boccon-Gibod et al. |
| 2007/0172065 A1 | 7/2007 | Lee et al. |
| 2007/0192596 A1* | 8/2007 | Otsuka ........................ 713/166 |
| 2008/0046758 A1 | 2/2008 | Cha et al. |
| 2008/0256646 A1 | 10/2008 | Strom et al. |
| 2009/0064341 A1 | 3/2009 | Hartung et al. |
| 2009/0178019 A1 | 7/2009 | Bahrs et al. |
| 2009/0217036 A1 | 8/2009 | Irwin et al. |
| 2009/0300775 A1 | 12/2009 | Chu et al. |

FOREIGN PATENT DOCUMENTS

| | | | |
|---|---|---|---|
| CN | 1723675 A | | 1/2006 |
| CN | 1778091 A | | 5/2006 |
| CN | 101057200 A | | 10/2007 |
| EP | 1648110 A1 | | 4/2006 |
| EP | 1667355 | | 6/2006 |
| JP | 2002/163396 | | 6/2002 |
| JP | 2003044436 | | 2/2003 |
| JP | 2003143137 | | 5/2003 |
| JP | 2005-523509 | | 8/2005 |
| JP | 2006085479 | | 3/2006 |
| KR | 10-2002095726 A | | 12/2002 |
| KR | 2004028083 A | | 4/2004 |
| KR | 2005070643 A | | 7/2005 |
| KR | 10-2003-0075821 | | 9/2006 |
| WO | WO03/058620 A2 | | 7/2003 |
| WO | WO 03/081499 | | 10/2003 |
| WO | WO 03/090049 | | 10/2003 |
| WO | WO 2004/027588 A2 | | 4/2004 |
| WO | WO 2004/066586 A2 | | 8/2004 |
| WO | WO 2004/095797 A1 | | 11/2004 |
| WO | WO2005071519 A1 | | 8/2005 |
| WO | WO 2006/063194 | | 6/2006 |

OTHER PUBLICATIONS

Office Action issued by USPTO on Jan. 5, 2012 for U.S. Appl. No. 12/624,802.
Extended European Search Report by EPO on Jan. 4, 2012 for the corresponding EP Patent Application No. 08753359.2 and the cited references.
Diffie, W. et al. "Authentication and Authenticated Key Exchanges", Designs, Codes and Cryptography, Kluwer Academic Publishers, Boston, US, vol. 2, No. 2, Jan. 1, 1992, pp. 114-119.
Schneier, B. "Applied Cryptography, Passage", Jan. 1, 1996, Applied Cryptography, Protocols, Algorithms, and Source Code in C, John Wiley & Sons, Inc., New York, pp. 183-184, 513-515, 518-520.
Korean Office Action dated Jan. 25, 2011 for Application No. 10-2009-7021449, with English translation, 9 pages.
International Search Report in Application No. PCT/KR2008/004503, mailed Feb. 19, 2009, 2 pages.
International Search Report and Written Opinion in Application No. PCT/KR2008/002562, mailed May 7, 2008, 6 pages.
International Search Report and Written Opinion in Application No. PCT/KR2008/002301, mailed Apr. 23, 2008, 7 pages.
Office Action issued by USPTO on Feb. 3, 2012 for U.S. Appl. No. 12/671,524.
Office Action issued by Japanese Patent Office on Apr. 9, 2012 for corresponding JP Patent Application No. 2010-506046, with English translation; 5 pages.
Office Action issued by the Japanese Patent Office on May 9, 2012 for JP Application No. 2010-520933, with English translation; 18 pages.
Office Action dated Aug. 27, 2012 in related application U.S. Appl. No. 12/601,612.
Office Action issued by the USPTO on Dec. 17, 2012 for corresponding U.S. Appl. No. 12/601,612; 15 pages.
Office Action issued by the USPTO on Dec. 13, 2012 for corresponding U.S. Appl. No. 12/671,524; 12 pages.
Certificate issued by the Chinese Patent Office dated Oct. 23, 2013 in corresponding Chinese Application No. 200880015346 1, including English translation, 22 pages.
Chinese Office Action dated Nov. 15, 2013 for Application No. 200880101845.2, with English Translation, 13 pages.
Notice of Allowance issued by the USPTO for corresponding U.S. Appl. No. 12/601,612; 16 pages.
Supplementary Partial European Search Report dated May 31, 2013 from EP Application No. 08741536.0, 9 pages.
DVB—Digital Video Broadcasting: "Digital Video Broadcasting (DVB); Content Protection & Copy Management", vol. A094. Nov. 1, 2005, 103 pages (XP007901168).

* cited by examiner

METHOD FOR PROTECTING CONTENTS, METHOD FOR SHARING CONTENTS AND DEVICE BASED ON SECURITY LEVEL

TECHNICAL FIELD

This document is related to a method for using contents, a method for sharing contents, and a device based on security level. This document describes technology related to contents security by which a device security level is assigned to a device and using contents is based on the device security level.

BACKGROUND ART

In general, through a wired or a wireless communication network, digital TV service provides various services that conventional analog broadcasting service cannot provide. For example, IPTV (Internet Protocol Television) service, which is one kind of digital TV service, provides interactivity by which the user can actively choose a program to watch, time to watch, and so forth. Based on such an interactive feature, IPTV service can also provide various additional services such as Internet search, home shopping, online game, and so forth.

To use the IPTV service, the user should be equipped with an IPTV set-top box. An IPTV set-top box is loaded with software supporting an interactive service and based on the software, carries out functions as a service client. For example, an IPTV set-top box requests transfer of broadcasting contents from a service provider while communicating with the service provider through an IP network and converts broadcasting signals received from the service provider into standard TV signals, transmitting the converted signals to TV receivers.

Meanwhile, associated companies are making an effort to expand service area of IPTV contents by linking IPTV service with the home network environment. Contents sharing service is one example of such effort. The contents sharing service associates an IPTV set-top box, which is an IPTV compatible terminal, with devices connected to the home network and redistribute the contents stored in the IPTV set-top box among the associated devices. Therefore, the contents sharing service enables the user to play IPTV contents at various devices preferred by the user.

One of the most important issues in implementing a system which provides the contents sharing service is to protect contents from illegal acts that can occur during sharing of contents, e.g., illegal leakage or copy of contents. In that regard, a security means or procedure for protecting contents is necessary in case of providing contents sharing service. Therefore, immediate development of security technology related to contents sharing service is required.

DISCLOSURE OF INVENTION

Technical Problem

The invention is related to provide a method for using contents, a method for sharing contents, and a device based on a security level, where a device security level is assigned to a device and whether to use the contents is determined by the device security level.

Technical Solution

To solve the above technical problem, an aspect of this document provides a method for using contents based on a security level. A method for using contents based on the security level comprises creating a device security level according to the number of device identification elements, receiving contents, and if the device security level is found to be a minimum allowed device security level for using the contents, using the contents.

The method for using contents can further comprise preventing using the contents if the device security level is lower than the minimum allowed device security level.

The method for using contents can still further comprise extracting a device identification element and transferring the element to a specific entity. In this case, the creating a device security level comprises receiving a certificate including the device security level from the specific entity and based on information about a device security level included in the certificate, creating device security level information.

Meanwhile, to solve the above technical problem, the invention has another aspect for providing a method for sharing contents based on a security level. The method for sharing contents based on security level comprises receiving contents and information about security level for using the contents from a service provider, receiving device security level information of the device to which the contents are to be transferred, and based on security level information for using the contents and the device security level information, determining whether to transfer the contents to the device.

The method for sharing contents based on security level can further comprise transferring security capability information to the service provider and receiving a certificate for device security level including device security level information from the service provider.

The receiving device security level information of the device can comprise receiving a certificate for device security level including device security level information of the device from the device at the time of mutual authentication.

Also, the determining whether to transfer the contents can comprise determining whether device security level of the device is higher or lower than the security level for using the contents.

In this case, the method for sharing contents based on security level can further comprise transferring the contents to the device when security level of the device is higher than the security level for using the contents and preventing transfer of the contents to the device when security level of the device is lower than the security level for using the contents. Also, the method for sharing contents based on security level can still further comprise enabling the device to download a security module for satisfying the security level by transferring security level information for using the contents to the device when transfer of the contents is prohibited.

Meanwhile, to solve the above technical problem, the invention has yet another aspect for providing a device based on security level. The device based on security level comprises a security level generation unit generating device security level according to the number of device identification elements, a receiver unit receiving contents, and a contents use controller using the contents if the device security level is found to be a minimum allowed device security level for using the contents. The contents use controller, if the device security level is lower than the minimum allowed device security level, can prevent using the contents.

Advantageous Effects

As described above, according to the invention, each device is assigned a device security level and based on the device security level, use of contents is determined. For example, security information is collected from a device and device security level is assigned to the device; based on the device security level, sharing of contents is determined. Therefore, if a required security condition, namely required security technology has not been applied or if it is not identified to satisfy the required condition, the corresponding device is kept from using contents, whereby security is reinforced.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DESCRIPTION OF BASIC COMPONENTS IN THE FIGURE

20: Service Provider
30: Domain
40: IPTV Receiving Device
41: IPTV Receiving/Transmitting Module
42: Security Controller
43: IPTV receiving device
431: Service Protection Module
432: Contents Protection Module
45: Rendering Module
46: Storage Module
47: Output Port
48: Device Control Module
50: Home Device

MODE FOR THE INVENTION

Hereinafter, preferred embodiments of the present invention will be described in detail with reference to appended drawings to enable those skilled in the art to easily implement the present invention. In the preferred embodiments of the invention to be described below, specific terminologies are utilized for clarity of description. The invention, however, is not limited to the selected terminologies and it should be understood that each individual terminology encompasses all the synonyms interpreted in a similar way to achieve a similar objective.

Figure 1:
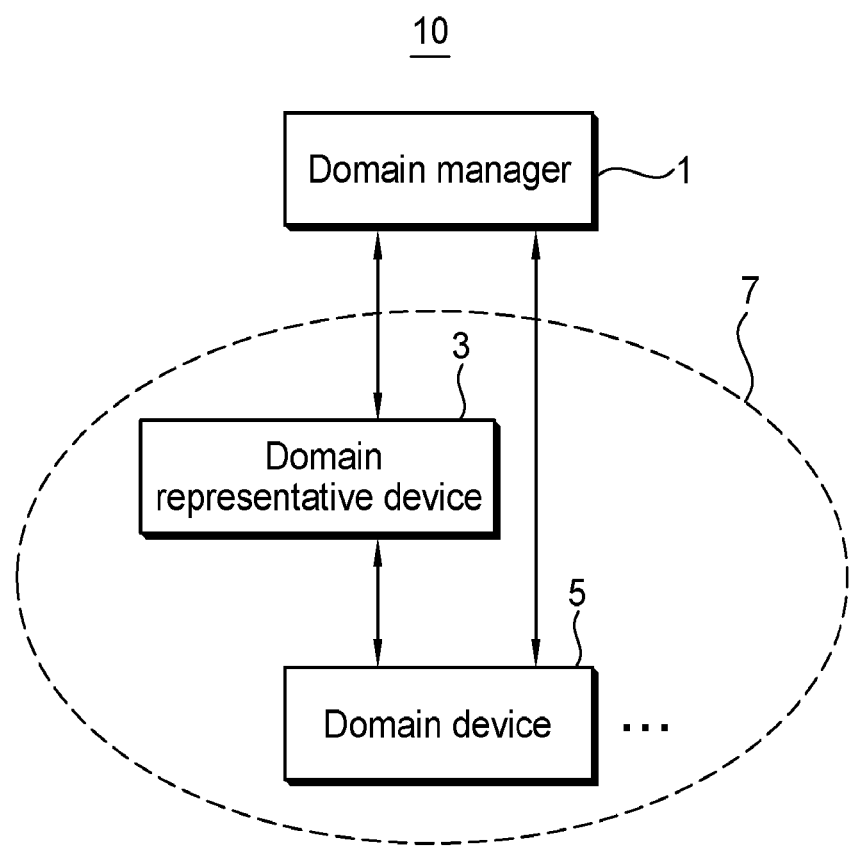
FIG. 1 illustrates a block diagram of a domain system for using and sharing contents according to a preferred embodiment of the invention.

FIG. 1 illustrates a block diagram of a domain system for using and sharing contents according to a preferred embodiment of the invention.

As shown in FIG. 1, a domain system 10 comprises a domain 7. A domain 7 is a set of domain devices 5, each of which is an authorized device. A domain 7 can represent a scope where a domain service is applied. Domain devices 5 belonging to the domain 7 can share and use contents among each other according to allowed security level.

A domain 7 can be composed of by taking account of physical locations of devices. That is to say, a domain 7 can be composed of devices belonging to a specific physical area. To organize such a domain 7, a local environment is required. A local environment, in this regard, can imply an environment where a physical network is equipped through which devices belonging to a specific local area can operate associated with each other and the physical network interworks with an external network.

A home network system is one example of such a local environment. A home network system provides such an environment where interworking of home appliances, various sensors, and security devices is possible at home through a wired or a wireless local network and connecting to an external network such as the Internet is realized by a communication node such as a home gateway. Organization of the local environment is possible when more than two interworking network devices are given, not to mention the home network system.

In what follows, an area where the local environment is implemented is called a domain area. In a domain area, multiple devices can exist. The user can organize a domain 7 by using such devices and then use contents being shared among domain devices 5. To register for a domain 7, a device transmits a domain registration request to a domain administrator 1; the domain administrator 1 which receives the request determines whether the domain registration request is proper and registers the device for the domain 7. Devices 5 registered with the domain 7 can share and use contents among each other according to allowed conditions. In some cases, a device outside the domain area, for example an external device connected through the Internet can also be registered to the domain as a remote state.

Meanwhile, a domain 7 can include a domain representative device 3. The domain representative device 3 can verify whether a device falls within the domain area by carrying out a proximity test against the corresponding device. That is to say, the domain representative device 3 can carry out a function of determining physical characteristics of the domain 7 (e.g., number of hops, response time, TTL, etc). The proximity test information can be used for the domain administrator 1 to authenticate a domain device 5 when the domain device 5 is registered for the domain or to determine whether the domain device 5 is in a local access (namely, a state where the domain device 5 accesses the domain within the scope of the domain) state or a remote access state (namely, a state where the domain device 5 accesses the domain outside the scope of the domain).

Also, the domain representative device 3 can carry out functions of domain administration, domain device management, domain device authentication, and so forth in collaboration with the domain administrator 1.

Such a domain representative device 3 can be assigned from among domain devices at a specific time (e.g., at the initial organization of a domain, at the time of request from the user, at the time of occurrence of an error at the existing domain representative device, etc). For instance, a domain device with the highest capability can be assigned as a domain representative device 3 while domain devices exchange device capability information among themselves; alternatively, domain devices transmit capability information to the domain administrator 1 or a specific device and the domain administrator 1 or the specific device that receives the capability information can assign a domain device with the highest capability as the domain representative device 3. The assigned domain representative device 3 carries out the aforementioned functions.

So far, organization of a domain system has been described. When the above concept of a domain is introduced to an IPTV service system, a contents sharing system where IPTV service contents can be used and shared among multiple devices can be configured.

Figure 2:
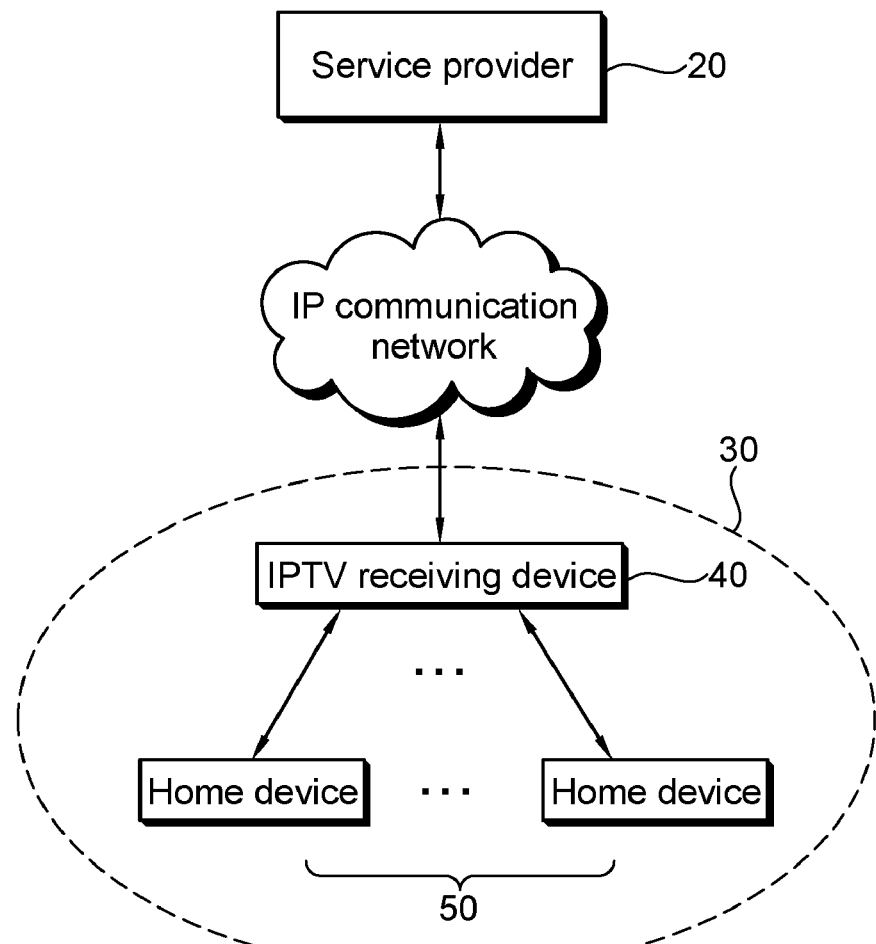
FIG. 2 illustrates a block diagram of a system for realizing a method for using and sharing contents based on security level according to a preferred embodiment of the invention.

FIG. 2 illustrates a block diagram of a system for realizing a method for using and sharing contents based on security level according to a preferred embodiment of the invention.

As shown in FIG. 2, an IPTV receiving device 40 can be connected to a service provider 20 through an IP communication network. At this time, the IPTV receiving device 40 denotes a terminal equipped with IPTV service functions, for example an IPTV set-top box. An IPTV receiving device 40 can be a domain representative device. On the other hand, such an IPTV receiving device 40 can interwork with a home device 50. The home device 50 in this case can be fixed or portable terminals equipped with a wired or wireless network function, for example home appliance, mobile phone, PC (Personal Computer), Notebook, PDA (Personal Digital Assistance), PMP (Portable Multimedia Player), remote controller, and so forth.

An IPTV receiving device 40 and a home device 50 can be registered in a domain 30 for sharing contents. In other words, an IPTV receiving device 40 and a home device 50 can be a domain device. For this purpose, an IPTV receiving device 40 and a home device 50 respectively request registration in the domain 30 from a service provider 20 and are registered in the domain 30 after registration authentication by the service provider 20.

The IPTV receiving device 40 or the home device 50, at the time of requesting registration for the domain 30, can provide security capability information of each own for the service provider 20. The security capability information can include information of security solutions (e.g., CAS module, DRM module, etc) applied to the corresponding devices or information of identification elements (e.g., processor ID, BIOS ID, set-top box ID, hard drive ID, smart card ID, factory provisioning ID, etc) of the corresponding devices.

The service provider 20, according to security capability information received from the IPTV receiving device 40 or home device 50, can assign device security level to the corresponding devices 40, 50 and share the device security level information with the corresponding devices 40, 50. For example, the service provider 20 analyzes security capability information received from the IPTV receiving device 40 or home device 50; identifies device security level of the corresponding device 40, 50; issues device security level certificate including the device security level information; delivers the certificate to the device 40, 50; and stores and manages the certificate for its own purpose.

Meanwhile, IPTV receiving device 40 can request and receive contents guide information from the service provider 20. At this time, the contents guide information is the information that informs of a schedule, a list, and additional information of service contents, which can be EPG (Electronic Program Guide), CPG (Content Program Guide), VoD contents guide, IPG (Interactive Program Guide), and so on.

IPTV receiving device 40 can process contents guide information received from the service provider 20 to agree with a user interface and display the processed information. The user can choose service contents that he or she wants from the displayed contents guide information. The IPTV receiving device 40 can then request the chosen contents from the service provider 20.

The service provider 20, according to the request form the IPTV receiving device 40, transfers the corresponding contents to the IPTV receiving device 40. At this time, the service provider 20 can transfer information related to contents required for using the contents—for example security level information, usage rights information, device list information, etc—to the IPTV receiving device 40 along with the contents.

The security level information can include minimum allowed security level that is a device security level required minimally for using contents. The minimum allowed device security level can be specified by the operator. The usage rights information is related to using contents, including information for describing usage rights exercised by, for example security solutions. Also, the device list information can include a list of domain devices authenticated and registered in the domain 30. Device list information can include a revocation device list which is a list of devices revoked by the domain 30. For a revocation device, sharing of contents can be limited.

IPTV receiving device 40 can receive contents transferred from a service provider 20, store and reproduce the contents, and transfer the contents to a home device 50 registered in the domain 30. To carry out storage, playback, or transfer of contents, information related to contents transferred from a service provider 20, for example security level information, usage rights information, device list information can be taken into account and based on the consideration, storage, playback, or transfer of contents can be limited.

Figure 3:
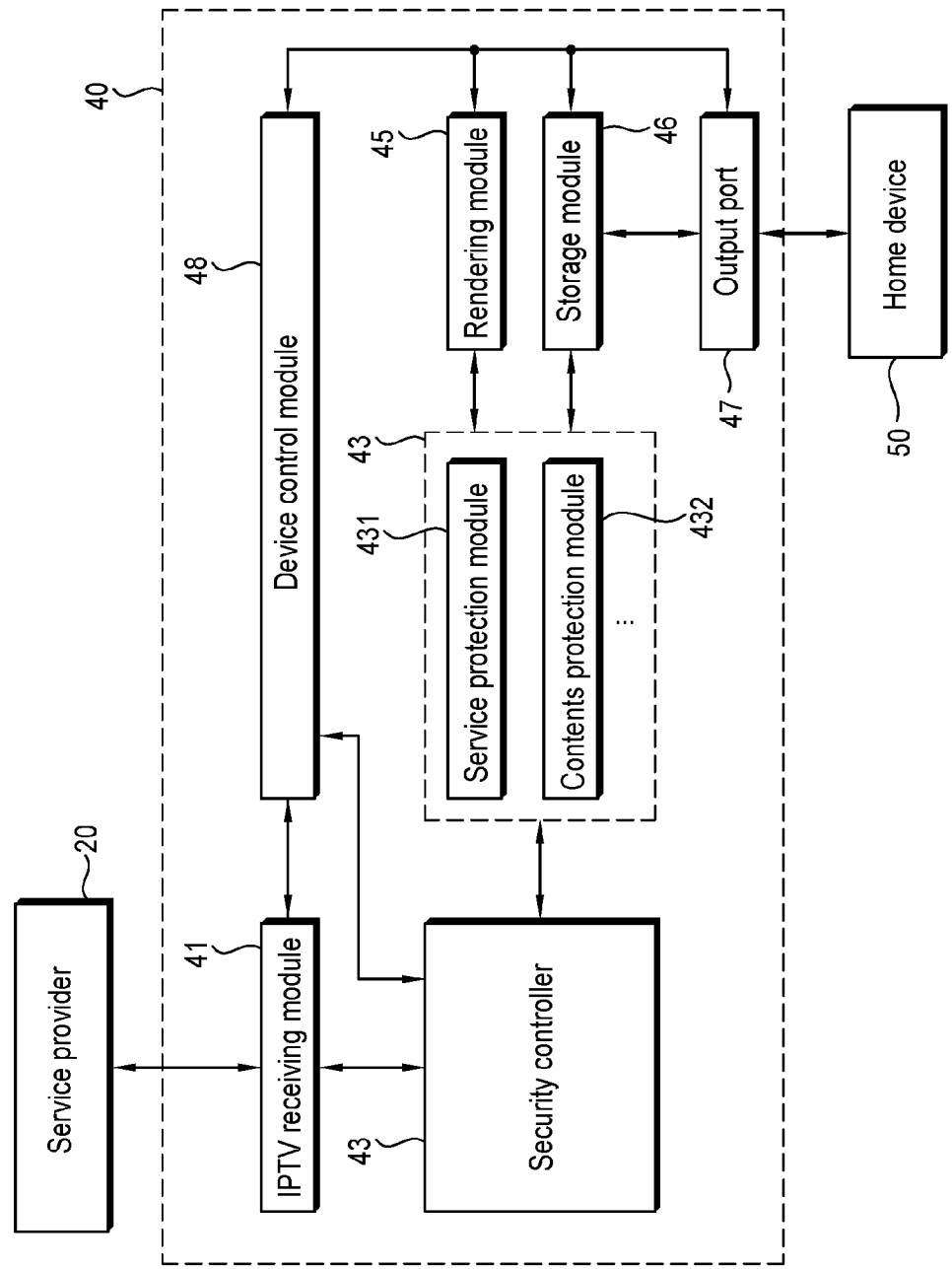
FIG. 3 illustrates a block diagram showing detailed structure of an IPTV receiving device illustrated in FIG. 2.

FIG. 3 illustrates a block diagram showing detailed structure of an IPTV receiving device illustrated in FIG. 2.

As shown in FIG. 3, IPTV receiving device 40 can comprise an IPTV receiving module 41, a security controller 42, a security module 43, a rendering module 45, a storage module 46, an output port 47, and a device control module 48. Being not shown, IPTV receiving device 40 is necessarily equipped with functional modules that a conventional IPTV terminal has such as an input module, a display module, a power module, and so on. Since the above modules are not directly related to the principle of the invention, separate drawings and descriptions thereof are not provided.

The IPTV receiving module 41 can carry out a function of transmitting and receiving data to and from a service provider 20. For example, The IPTV receiving module 41 receives from the service provider 20 contents and contents-related information required for using the contents such as security level information, usage rights information, device list information, and so on. The IPTV receiving module 41 can receive such contents and the contents-related information in the form of TS (Transport Stream). Service protection technology, for example CAS (Conditional Access System) or DRM (Digital Rights Management) may have been applied to the contents and scrambled with the contents.

The security controller 42 can carry out functions related to security control for security of contents. For example, the security controller 42 can request from the service provider 20 registration of IPTV receiving device 40 for a domain and receive a certificate certifying joining the domain 30. At the time of requesting registration for the domain, the security controller 42, by examining a security module 43 installed in the IPTV receiving device 40, can provide the service provider 20 with security capability information (e.g., information of CAS, DRM, security OS, etc applied to IPTV receiving device) including information of security solutions applied to IPTV receiving device 40 or provide the service provider 20 with security capability information (e.g., information of processor ID, BIOS ID, set-top box ID, hard drive ID, etc) including information of identification elements of IPTV receiving device, and store a device security level certificate received from the service provider 20.

The security controller 42 receives contents and contents-related information required for using contents transferred from a service provider 20, controls a functional module for using contents, for example a security module 43 to convert scrambled contents to clean contents. The security controller 42, according to the request of the device control module 48, can transfer the converted clean contents to the rendering module 45, reproducing the contents; also, the security controller 42, by controlling the security module 43, can encrypt the contents according to contents security technology, store the encrypted contents into the storage module 46 or transfer the encrypted contents to a home device 50 through an output port.

For the case of transferring contents to a home device 50, the security controller 42 can control transfer of contents by taking account of security level information, usage information, device list information, etc. For example, the security controller 42, when contents are to be transferred to a home device 50, can receive from the home device 50 information indicative of device security level of the home device 50 and examine whether the device security level of the home device 50 meets a minimum allowed device security level required for using contents. If the device security level of the home device 50 meets the minimum allowed device security level required for using contents, contents are transferred. On the contrary, if the device security level of the home device 50 does not meet the minimum allowed device security level required for using contents, transfer of the contents is prohibited. For the latter case, the home device 50 can be requested to install security modules required to meet the minimum allowed device security level.

Such a security controller 42 can include a security level generation unit generating device security level in accordance with the number of device identification elements, a contents use controller using the contents when the device security level is a minimum allowed device security level for using contents, and so on. The security level generation unit can generate device security level by extracting information from a device security level certificate received from a service provider 20. On the other hand, depending on an embodiment, after security capability information is extracted from the security level generation unit, device security level can be generated either by application of security technology according to a predetermined criterion (e.g., a criterion defined by a service provider) or by the number of device identification information. Meanwhile, the contents usage controller can limit the use of the contents when the device security level is lower than the minimum allowed device security level.

A security module 43 carries out a security function for using contents according to the control of the security controller 42. The security module 43 can comprise a service protection module 431, contents protection module 432, and so forth.

A service protection module 431 can be a service protection solution which can apply service protection technology to contents or cancel the application. The service protection module 431 can be a CAS module, a DRM module, or other module of a similar kind. For example, the service protection module 431 can extract a descrambling key from TS received from a service provider 20 and descramble scrambled contents by using the descrambling key, converting scrambled contents to clean contents.

A contents protection module 432 can be a contents protection solution which can apply contents protection technology to contents or cancel the application. The contents protection module 432 can be a DRM module, a copy protection module, ASD (Authorized Service Domain) module, or other module of a similar kind. For example, the contents protection module 432 can encrypt clean contents according to DRM technology for storing contents or transferring the contents to a home device 50 or decrypt the encrypted contents for reproducing the contents.

A rendering module 45 carries out a function of reproducing contents. For example, the rendering module 45 can receive clean contents from the security module 43 and reproduce the clean contents by decoding the contents. Meanwhile, a storage module 46 carries out a function of storing contents. For example, the storage module 46 can store clean contents converted by the security module 43 or encrypted (namely, encrypted by using DRM technology) contents according to contents protection technology.

An output port 47 carries out a function of interworking with a home device 50. For example, the output port 47 can carry out a function of transferring contents to a home device 50. Meanwhile, a device control module 48 carries out a function of controlling the overall interaction and data flow among the aforementioned modules 41 47. The device control module 48 can accept the user's request and carry out a control function according to the request.

Figure 4:
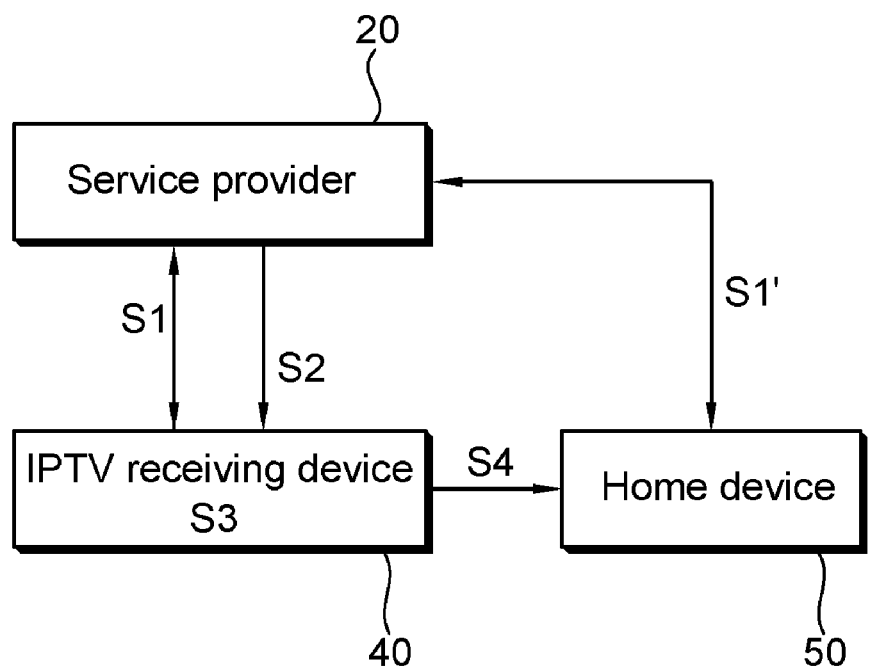
FIG. 4 illustrates an overall flow diagram of a method for sharing contents based on security level according to a preferred embodiment of the invention.

FIG. 4 illustrates an overall flow diagram of a method for sharing contents based on security level according to a preferred embodiment of the invention.

As shown in FIG. 4, a method for sharing contents based on security level according to a preferred embodiment of the invention can comprise registering a device S1, S1', providing contents and contents-related information S2, using contents S3, and sharing contents S4. In the following, the aforementioned steps (S1, S1', S2, S3, and S4) are described in detail.

Figure 5:
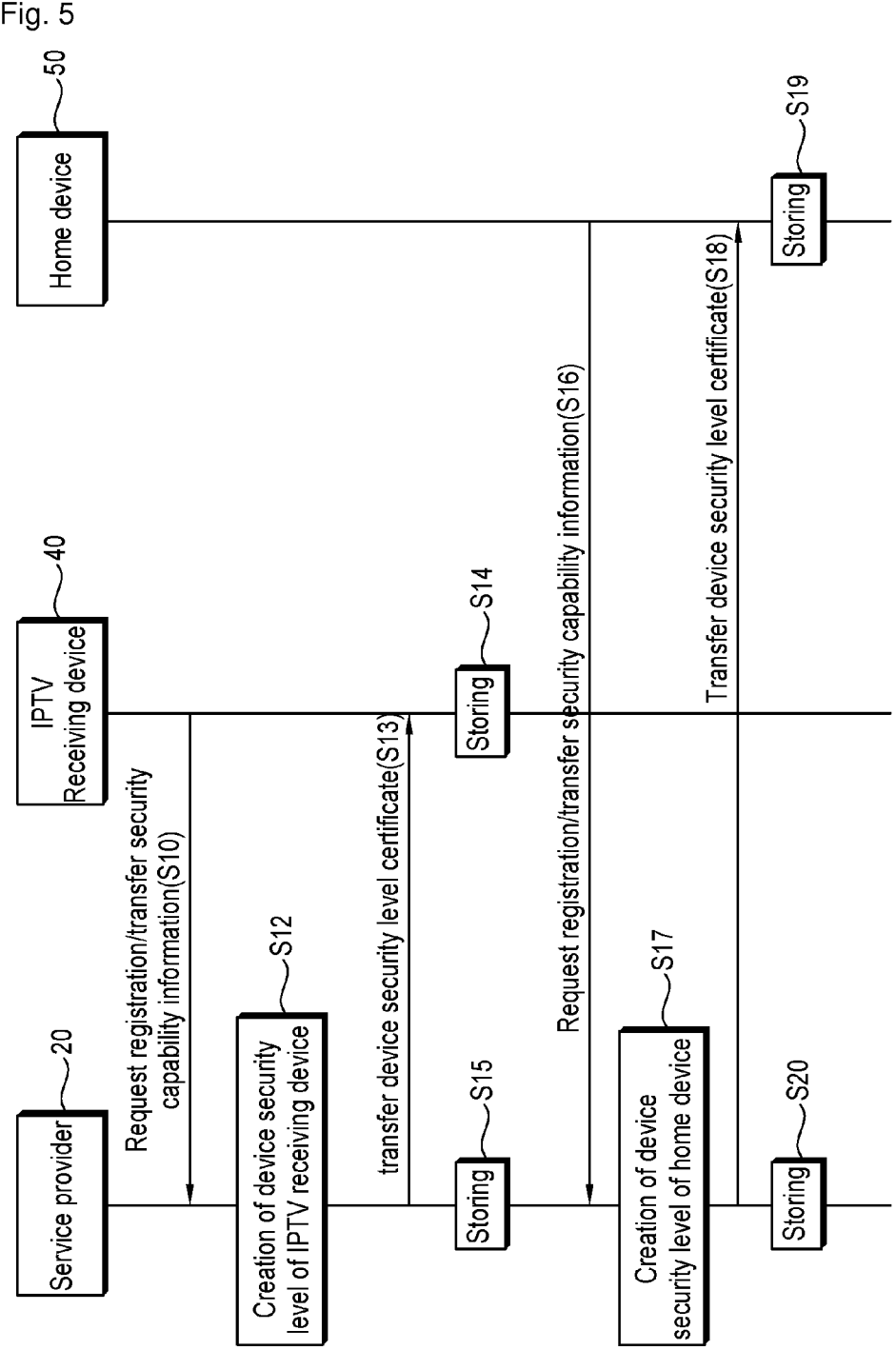
FIG. 5 illustrates a flow diagram of a detailed procedure of device registration for registering a device for a domain.

FIG. 5 illustrates a flow diagram of a detailed procedure of device registration for registering a device for a domain.

Referring to FIGS. 4 and 5, IPTV receiving device 40 can request registration to a domain from a service provider 20. At this time, IPTV receiving device 40 can transfer security capability information of the IPTV receiving device 40 to the service provider 20, S11.

For this purpose, IPTV receiving device 40 can collect information of a security module installed to itself, generates security capability information indicating what security technology has been applied to the IPTV receiving device 40, and transfers the information to the service provider 20. For example, if a service protection module (namely, a CAS module, etc), a contents protection module (namely, a DRM module, a copy protection module, etc), and a system protection module (namely, security OS, security memory, etc) are installed at the IPTV receiving device 40, the IPTV receiving device 40 generates security capability information informing that the IPTV receiving device 40 is equipped all with a service protection module, a contents protection module, and a system protection module and transfers the generated information to the service provider 20.

Also, the IPTV receiving device 40 can extract information of identification elements for the IPTV receiving device itself, generate security capability information including the identification elements, and transfer the generated information to a service provider 20. At this point, the identification element of the IPTV receiving device 40 is information of identification elements that can be used to organize identifying information (e.g., device fingerprint) for uniquely identifying the IPTV receiving device; the identification element can include not only physical identification information of hardware installed to the IPTV receiving device 40, processor ID, BIOS ID, set-top box ID, and hard drive ID but also property information that can be used for distinguishing the IPTV receiving device 40 and identifying information of elements related to devices such as user ID, password, smart card ID, factory provisioning identification system, etc.

The service provider 20, after receiving security capability information of IPTV receiving device 40, generates device security level corresponding to the security capability of the IPTV receiving device 40 S12, issues a device security level certificate including information of the generated device security level, and transfers the certificate to the IPTV receiving device 40, S13. The service provider 20 can store and manage the device security level certificate of the IPTV receiving device 40, S15.

Using the same concept as the procedure above, a home device 50 can request registration for a domain from a service provider 20. In this case, the home device 50 can transfer security capability information of the home device 50 to a service provider 20, S16.

For this purpose, the home device 50 can collect information of a security module installed to itself, generate security capability information describing what security technology has been applied to the home device 50, and transfer the generated information to the service provider 20. For example, if the home device 50 is equipped only with a contents security module and a system protection module but not with a service protection module, the home device 50 generates security capability information informing that the home device 50 itself is equipped with a contents protection module and a system protection module and transfers the generated information to the service provider 20. Alternatively, the home device 50 can extract identification elements that can be used to organize identifying information (e.g., device fingerprint) of the home device itself 50, generate security capability information including information of the identification elements, and transfer the generated information to a service provider 20. For example, the home device 50 can extract processor ID of a processor installed to the home device itself 50, BIOS ID of the home device 50, hard drive ID of a hard drive installed to the home device 50, user ID and password, smart card ID, etc, generate security capability information including information of extracted identification elements, and transfers the generated information to the service provider 20.

The service provider 20, after receiving security capability information of the home device 50, generates device security level corresponding to the security capability of the home device 50, S17, issues a device security level certificate including the generated information of the device security level, and transfers the certificate to the home device 50, S18. The home device 50 then receives the certificate and stores the certificate S19. Meanwhile, the service provider 20 can store and manage the device security level certificate of the home device 50, S20.

The device security level can be determined in accordance with security technology applied to the device (namely, IPTV receiving device or the home device)—in this case, a service provider can receive security capability information including information of security technology applied to the device—or in accordance with how many device identification elements have been considered for unique identifying information of the device (e.g., device fingerprint)—in this case, a service provider can receive security capability information including identifying information of constituting elements installed in the device. In other words, device security level can be generated according to the number of device identification elements.

If device security level is determined by the former, namely security technology applied to a device, device security level can be set arbitrarily high as the number of security technologies applied to the device becomes large. For example, if the service protection technology, contents protection technology, and system protection technology are all applied to a device, device security level of the corresponding device can be assigned the highest level, 'level 4'; if only contents protection technology and system protection technology are applied to the device, 'level 3' is assigned to the device; if only service protection technology and system protection technology are applied to the device, 'level 2'; if only system protection technology is applied to the device, 'level 1' is assigned to the device; if none of the above technologies is applied to the device, 'level 0' is assigned to the device. The example described in detail above is just an example of an embodiment; it should be understood that device security level can be subdivided in accordance with each individual protection technology or take account of various protection technologies. Also, device security level can be set as high as the security level of applied security technology.

In the above example, since service protection technology, contents protection technology, and system protection technology are all applied to the IPTV receiving device 40, the service provider 20 can assign the device security level of the IPTV receiving device 40 the highest device security level, 'level 4'. On the other hand, since only content protection technology and system protection technology have been applied to the home device 50, device security level lower than that of the IPTV receiving device 40 can be assigned, namely 'level 3'. If it is assumed that only system protection technology has been applied to the home device 50, device security level of the home device 50 will be set very low. In this case, chances are high that the home device 50 will be kept from using contents through contents sharing.

If device security level is determined by the latter, namely number of device identification elements used for unique identifying information of a device, device security level can be set high as the number of device identification elements becomes large. It is because if identifying information of a device takes account of as many device identification elements as possible, identification of the device is conducted more precisely and as identification of a device becomes more precise, chances of preventing illegal acts done by unauthorized devices and improving security at the time of application of security technology gets higher. For example, if security capability information of a device includes all of processor ID, BIOS ID, set-top box ID, and hard drive ID and additional identifying information, the security level of the corresponding device can be assigned the highest level, 'level 3'; if only processor ID, BIOS ID, set-top box ID, and hard drive ID are included, 'level 2' is assigned to the device; if more than one device identification element is included but not all of processor ID, BIOD ID, set-top box ID, and hard drive ID, 'level 1' is assigned to the device; if none of processor ID, BIOS ID, set-top box ID, and hard drive ID is included, 'level 0' is assigned to the device. The example described in detail above is just an example of an embodiment; it should be understood that specific identification elements can be weighed more or various identification elements can be taken into account.

Figure 6:
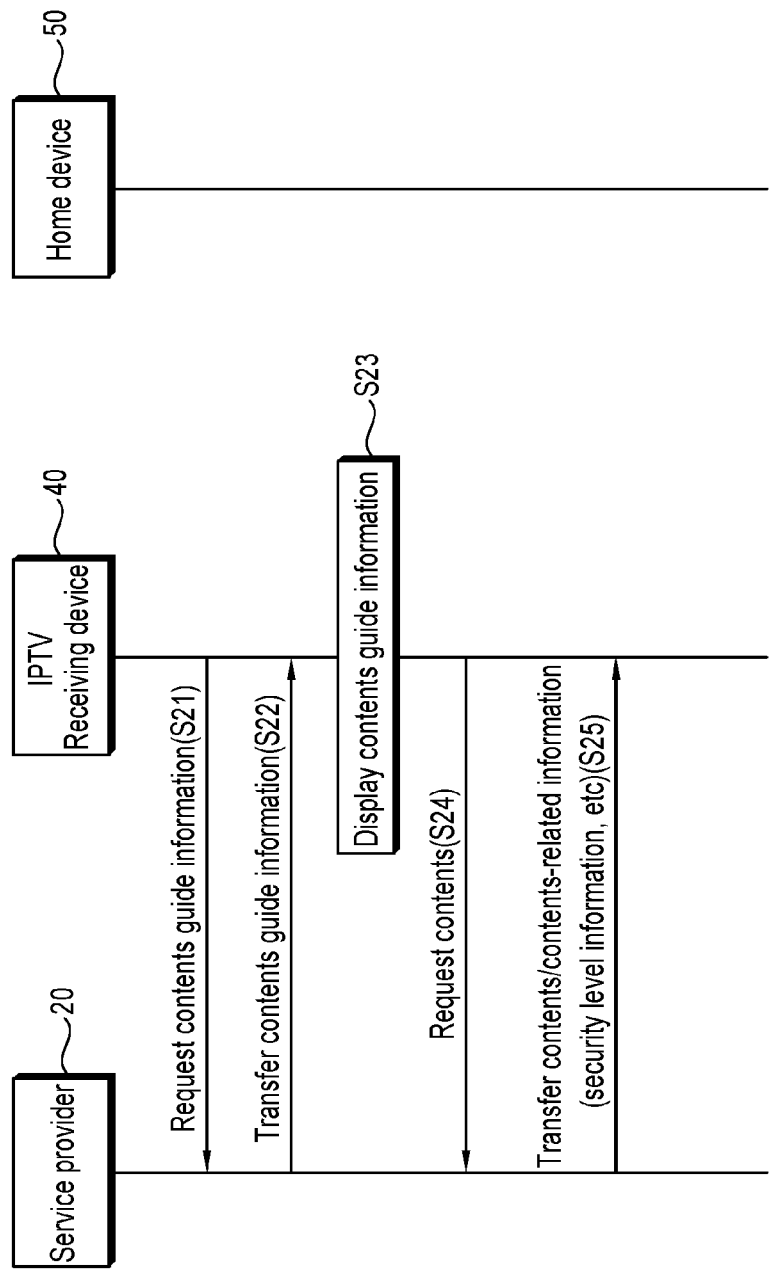
FIG. 6 illustrates a flow diagram of a detailed procedure of providing contents and information related to the contents.

If registration of a device is completed, providing contents and information related to the contents S2 can be carried out. FIG. 6 illustrates a flow diagram of a detailed procedure of providing contents and information related to the contents S2.

Referring to FIGS. 4 through 6, IPTV receiving device 40 requests contents guide information (e.g., EPG, CPG, etc) from a service provider 20, S21. The service provider 20 generates contents guide information in response to the request and transfers the generated information to the IPTV receiving device 40, S22. The IPTV receiving device 40 can then process contents guide information received from the service provider 20 to agree with a user interface and display the processed information S23.

Subsequently, IPTV receiving device 40 can request specific contents (e.g., contents that the user has requested) from a service provider 20, S24. The service provider 20 can transfer contents and information related to the contents in response to the request S25. At this moment, the contents can be scrambled by service protection technology. Also, the information related to the contents can include security level information, usage rights information, device list information, etc.

The security level information can represent the information indicative of the minimum allowed device security level that is a minimum device security level required for using contents. For example, a service provider 20, for the case of the contents requiring high security, can assign the highest security level, 'level 4' to the minimum allowed device security level of the corresponding contents whereas a minimum allowed device security level, for example 'level 1'—which is one of low security levels—can be assigned to the contents that do not require high security. The minimum allowed device security level can be set differently according to the use pattern of contents. For example, a minimum allowed device security level required for reproducing contents, a minimum allowed device security level for sharing contents, and a minimum allowed device security level for copying contents can be set differently from each other.

Meanwhile, usage rights information can represent usage rights information to be used by, for example a service protection module or contents protection module. Device list information can include a list of domain devices authenticated by and registered to the domain and can also include a revocation device list that is a list of devices revoked by the domain.

As described above, after provision of contents and information related to the contents is completed, a step of using contents S3 can be carried out. At the time of rendering, copy, consumption, move, and sharing of contents, use of the contents can be limited based on information related to the contents that a service provider 20 has provided. For example, a device generates device security level information of the device and determines whether the device security level meets a minimum allowed device security level of the contents; if the device security level is higher than the minimum allowed device security level, the contents can be used. Otherwise, use of the contents can be limited. That is to say, a device can use contents if security level of the device is higher than a minimum allowed device security level of the contents whereas if security level of the device is lower than the minimum allowed device security level, use of the contents can be prohibited. The device security level information can be generated by extracting the contents included in a device security level certificate. Meanwhile, according to an embodiment, a device can extract security capability information spontaneously and then generate the device security level information by taking account of application of security technology or number of device identification information.

During the step of using contents, IPTV receiving device 40, if contents provided by a service provider 20 are found to have been scrambled by service protection technology, can extract a descrambling key provided from the service provider 20 and convert the contents into clean contents by descrambling the contents by using a service protection module. The IPTV receiving device 40 can decode and play the clean contents converted as described above.

Meanwhile, IPTV receiving device 40 can generate an encryption key, encrypt the clean contents by using the encryption key through a contents protection module, and store the encrypted clean contents in storage.

In case of playing encrypted contents stored in storage, IPTV receiving device 40 can decrypt the encrypted contents by using the encryption key, decode the decrypted contents, and play the decoded contents.

Figure 7:
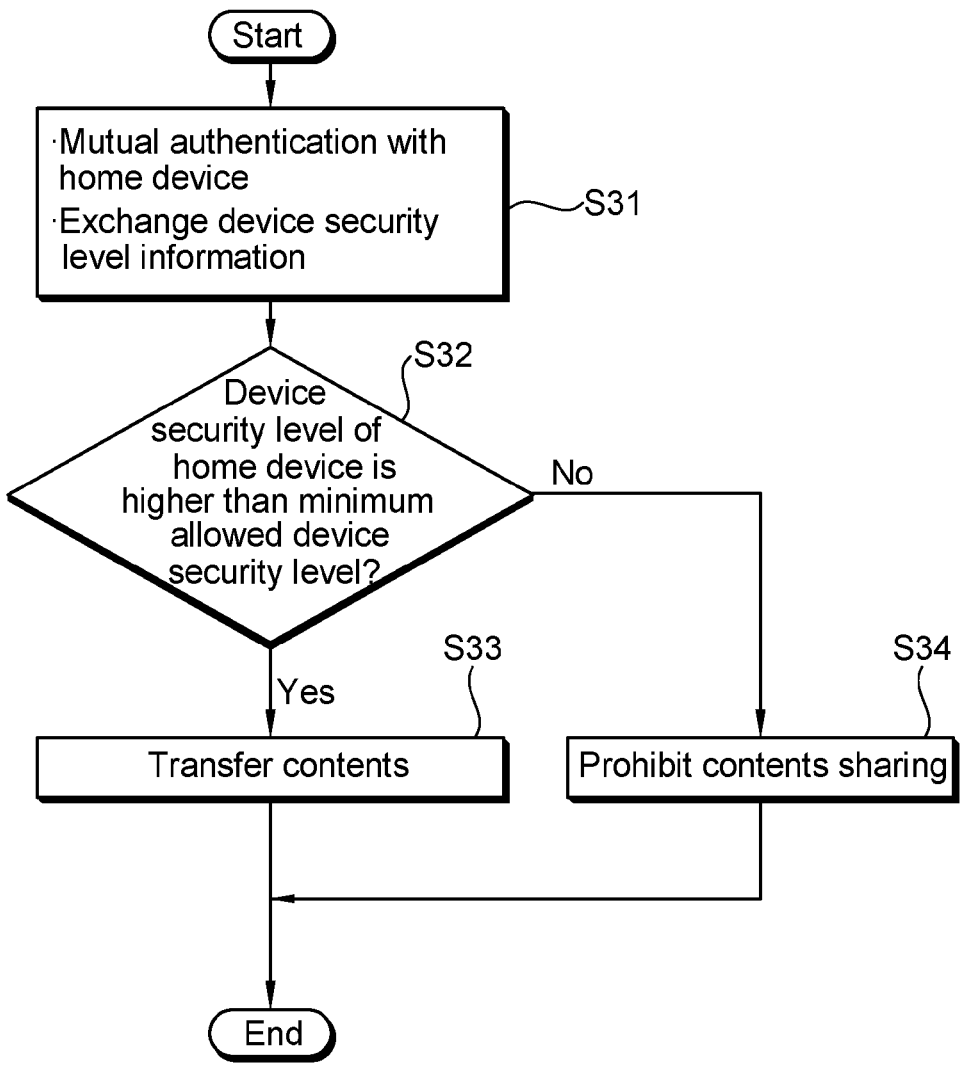
FIG. 7 illustrates a flow diagram of a detailed procedure of sharing contents illustrated in FIG. 4.

FIG. 7 illustrates a flow diagram of a detailed procedure of sharing contents illustrated in FIG. 4.

Referring to FIGS. 4 through 7, to share contents, IPTV receiving device 40 and a home device 50 can carry out mutual authentication first. At this time, the IPTV receiving device and the home device 50 can exchange device security level certificates S31.

Subsequently, the IPTV receiving device 40 can refer to the device security level certificate of the home device 50, extract device level information of the home device 50, and check whether the device security level of the home device 50 is higher than a minimum allowed device security level required for using contents (e.g., sharing contents) that are to be transferred S32.

If the device security level of the home device is higher than the minimum allowed device security level required for using contents, the IPTV receiving device 40 transfers the contents to the home device 50, S33. The home device 50 can then receive and use the contents.

On the contrary, if security level of the home device 50 is lower than the minimum allowed device security level required for using contents, the IPTV receiving device 40 prohibits transfer of the contents S34. In this case, the IPTV receiving device 40, by providing the home device 50 with information about the minimum allowed device security level for using the contents, can guide the home device 50 to download a security module required to meet the minimum allowed device security level from a service provider 20.

Also, if the IPTV receiving device 40 receives a message informing that the home device 50 has downloaded the security module and installed the downloaded module, the IPTV receiving device 40 can transfer the contents. When a new security module has been downloaded to the home device 50, the home device 50 can report downloading of the new module to a service provider 20 and the service provider 20 can issue an updated device security level certificate and transfer the certificate to the home device 50.

Meanwhile, when IPTV receiving device 40 transfers contents to a home device 50, information about a minimum allowed device security level of the contents can be transferred together. Information about the minimum allowed device security level of contents transferred to a home device 50 can be used when the home device 50 tries to share the contents with another home device. In this case, operations of the home device 50 and another home device can be carried out in such a way to keep pace with an operational procedure of IPTV receiving device 40 and a home device 50 illustrated in FIG. 7.

The preferred embodiments of the present invention have been described with appended drawings. However, those skilled in the art may easily understand that the present invention can be embodied with various modifications within the spirit and scope of the present invention. Therefore, further modification of the embodiments of the present invention will belong to the scope of the present invention.

The invention claimed is:

1. A method for using contents based on security level, comprising:
    setting a device security level that indicates how accurately a device can be identified, the device security level being based on information on one or more device identification elements extracted from the device, wherein the information on the one or more device identification elements is used to organize a device fingerprint that uniquely identifies the device and includes at least one of: a processor identifier of the device, a BIOS identifier of the device, a set-top box identifier of the device and a hard drive identifier of the device;
    receiving contents; and
    using the content on determining that the device security level satisfies a minimum allowed device security level criterion for using the contents,
    wherein setting the device security level comprises:
    setting the device security level at a first level upon determining that the information on the one or more device identification elements includes at least one of: the processor identifier of the device, the BIOS identifier of the device, the set-top box identifier of the device, and the hard drive identifier of the device, and excludes at least one of: the processor identifier of the device, the BIOS identifier of the device, the set top box identifier of the device and the hard drive identifier of the device,
    setting the device security level at a second level upon determining that the information on the one or more device identification elements includes the processor identifier of the device, the BIOS identifier of the device, the set top box identifier of the device and the hard drive identifier of the device, and
    setting the device security level at a third level upon determining that the information on the one or more device identification elements includes the processor identifier of the device, the BIOS identifier of the device, the set top box identifier of the device, the hard drive identifier of the device and an additional identifying element.

2. The method of claim 1, further comprising:
    preventing using the contents if the device security level is lower than the minimum allowed device security level.

3. The method of claim 1, further comprising,
    extracting the device identification elements from the device; and
    transferring security capability information including the extracted information on the one or more device identification elements to a server,
    wherein setting the device security level comprises:
    receiving, from the server, a certificate including the device security level; and
    storing the device security level included in the received certificate.

4. A device comprising:
    a security level generation controller configured to set a device security level that indicates how accurately a device can be identified, the device security level being based on information on one or more device identification elements extracted from the device, wherein the information on the one or more device identification elements is used to organize a device fingerprint that uniquely identifies the device and includes at least one of: a processor identifier of the device, a BIOS identifier of the device, a set-top box identifier of the device and a hard drive identifier of the device;
    a receiver unit receiving contents; and
    a contents use controller using the contents on determining that the device security level satisfies a minimum allowed device security level criterion for using the contents,
    wherein the security level generation controller is configured to:
    set the device security level at a first level upon determining that the information on the one or more device identification elements includes at least one of: the processor identifier of the device, the BIOS identifier of the device, the set-top box identifier of the device, and the hard drive identifier of the device, and excludes at least one of: the processor identifier of the device, the BIOS identifier of the device, the set top box identifier of the device and the hard drive identifier of the device,
    set the device security level at a second level upon determining that the information on the one or more device identification elements includes the processor identifier of the device, the BIOS identifier of the device, the set top box identifier of the device and the hard drive identifier of the device, and
    set the device security level at a third level upon determining that the information on the one or more device identification elements includes the processor identifier of the device, the BIOS identifier of the device, the set top box identifier of the device, the hard drive identifier of the device and an additional identifying element.

5. The device of claim 4, wherein the contents use controller prevents using the contents on determining that the device security level is lower than the minimum allowed device security level.

* * * * *